Sept. 27, 1927.
A. G. BOGARDUS
1,643,803
DEVICE FOR PROTECTING CONDENSERS
Filed Feb. 18, 1922
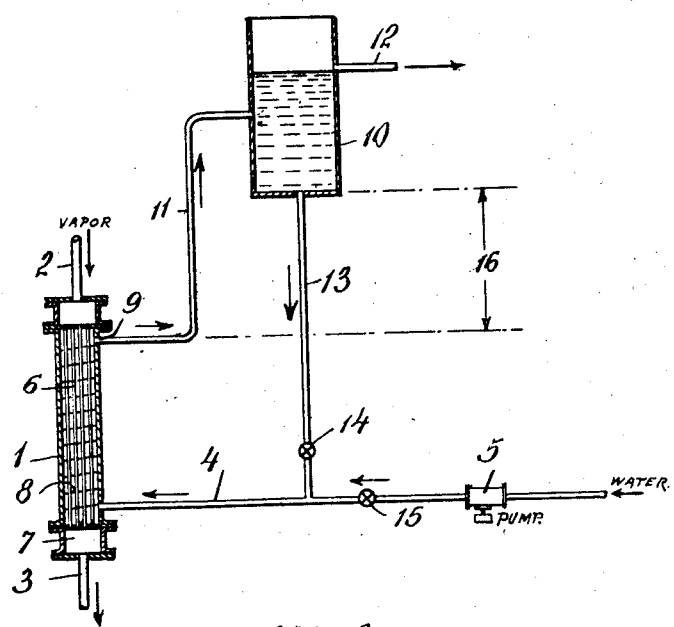
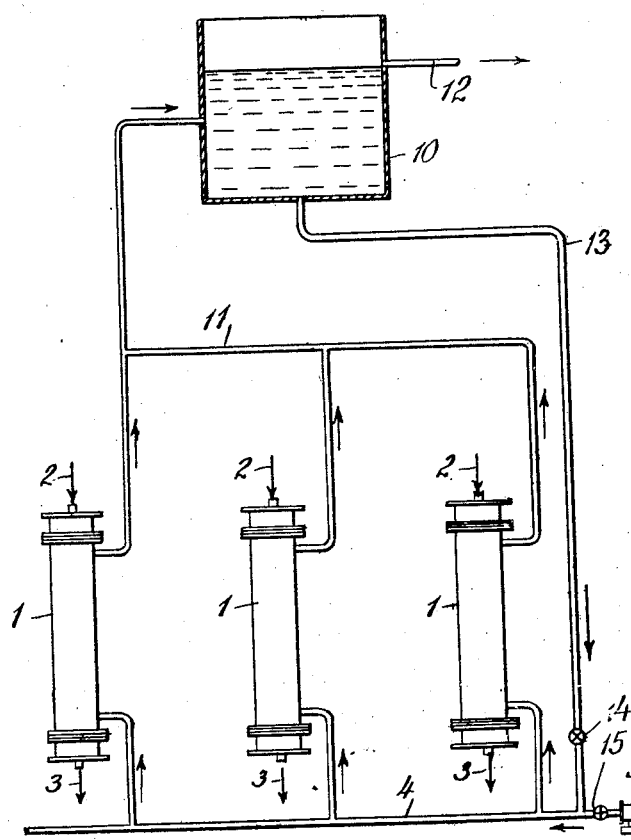
INVENTOR.
Arthur G. Bogardus
Pennie, Davis,
Marvin, & Edmonds
ATTORNEYS Patented Sept. 27, 1927.

1,643,803

UNITED STATES PATENT OFFICE.

ARTHUR G. BOGARDUS, OF CHICAGO, ILLINOIS, ASSIGNOR TO THE GRISCOM-RUSSELL COMPANY, OF NEW YORK, N. Y., A CORPORATION OF DELAWARE.

DEVICE FOR PROTECTING CONDENSERS.

Application filed February 18, 1922. Serial No. 537,401.

The present invention relates to apparatus for the protection of condensers and associated apparatus, and has to do particularly with protection in case of failure of the cooling fluid normally supplied to the condenser.

Apparatus for condensing steam, distilled oil vapors, and the like, is commonly supplied with water or other cooling fluid from any convenient source to absorb and carry away the heat of the vapors being condensed. The cold liquid is forced through the condensing apparatus by means of a pump or under the influence of gravity at a sufficient rate to condense all of the vapors entering the condenser, or such portions of them as it is desired to condense. Suitable apparatus may be provided for the purpose of allowing only condensate to escape from the condenser. This type of condenser is open to the objection that, upon failure of the cooling liquid supplied, vapors will rapidly accumulate within the condenser and in the absence of any cooling medium to convey away the latent heat of vaporization will remain uncondensed and are likely to produce pressures sometimes dangerous within the various apparatus.

In the oil refining industry it is particularly common to distill the crude petroleum at low pressures. The distilling apparatus is usually operated at atmospheric pressure and is not built sufficiently strong to withstand pressures materially above atmospheric. The distilled vapors are commonly passed from the low pressure still directly to the condensing apparatus, from which the condensate is continuously drawn off as it accumulates. A decrease or cutting off of the supply of cooling water to the condenser results in accumulation of distilled vapors within the condenser with a consequent rise in pressure. Inasmuch as the condenser and low pressure distilling apparatus are in direct communication, this pressure is transferred to the distilling apparatus and is likely to burst parts of the apparatus with resulting damage to property and danger if the trouble is not located immediately.

It is a principal object of the present invention to provide protective apparatus for condensers which serves to temporarily continue the operation of the condenser in case the supply of cooling fluid fails, thus affording time for the difficulty to be relieved by restoring the cooling fluid to its normal flow or diverting the vapor supply issuing from the distilling apparatus.

It is a further object to provide protective apparatus of this type which is entirely automatic in its operation, and whose actuation is dependent directly upon a change of the operating conditions of the condenser from normal, thus obviating the likelihood of failure in an emergency.

It is a still further object to provide protective apparatus of this type which does not add materially to the cost of a plant, and which furthermore may easily and conveniently be applied to existing installations.

I have illustrated a preferred embodiment of my invention in the accompanying drawings; in which Fig. 1 is a view, somewhat diagrammatic, of a typical layout illustrating the application of my improved protective apparatus to a condenser system; and Fig. 2 is a similar view showing a modified adaptation of the invention.

Referring to the drawings, and particularly to Fig. 1, 1 indicates a condenser employed for the condensing of vapors conveyed to it through the line 2. The vapor supply to the condenser may be steam from an evaporating plant, oils, gasoline, kerosene, or the like, from a petroleum distilling system, or other vapor which it is desired to condense. The condensate is discharged from the condenser through the line 3, suitable means (not shown) being provided if desired to prevent the escape of uncondensed vapors. The flow of the vapor into the condenser may be continuous or intermittent, and the cooling water supplied through line 4 by means of a pump 5 effects a continuous condensation of a portion of the vapor, the condensate being discharged constantly through the pipe 3 and conveyed to a storage reservoir or point of use.

The condenser 1 may be of any desired type, but I have here illustrated a condenser similar to that disclosed in the patent to Russell C. Jones, No. 1,335,506. The vapor is preferably admitted at the top of the condenser into a plurality of tubes 6 extending longitudinally of the apparatus. Condensation occurs during the passage of the fluid through these tubes, and the condensate is discharged into a collecting chamber 7 at the bottom of the condenser, from whence it makes its way into the discharge line 3. Within the outer shell of the condenser and surrounding the tubes 6 is a baffle member 8 which provides a tortuous passage for the cooling fluid through the condenser and causes it to flow at all times in a direction substantially transverse to the length of the tubes. The cooling liquid is admitted at the lower end of the shell into the space surrounding the tubes 6 and from thence flows upwardly, following the course of the baffle, until it reaches the outlet opening 9 and issues from the condenser. The type of condenser shown may be employed for the condensation of vapors of any kind, but is particularly applicable for condensing oil vapors. The small volume of fluid contained in the condenser at any one time and the consequent small space occupied render this type of condenser convenient for installation, while the high velocity of the cooling fluid through the shell effects a high heat transfer efficiency.

In the normal operation of the condenser, cooling fluid is supplied by the pump 5 through the line 4 and, after traversing the condenser, is conveyed away through outlet 9 and the line 11. My improved protective apparatus comprises a tank or reservoir 10 positioned at a level above that of the condenser 1 and receiving its supply of water through the discharge line 11. During normal operation the tank 10 remains full, and as water is discharged into it through the line 11 an overflow pipe 12 serves to hold the liquid level within the tank at a fixed position.

A discharge line 13 leads from the bottom of the tank through the valve 14 and joins with the water supply line 4. The valve 14 may be a manually controlled valve of the ordinary type, but in order to secure automatic operation of my protective apparatus I preferably construct this valve as a check or back pressure valve which is operated by variations in pressure in the line on opposite sides of the valve. Under normal conditions the valve is subjected to a downward pressure due to the head of liquid in the elevated reservoir 10, and at the same time is exposed to an upward pressure imparted to it from the feed line 4. Under these conditions valve 14 is arranged to remain closed, while a similar valve 15 placed in the feed line 4 at a point between the pump and its junction with line 13 remains open.

Upon failure of the water supply through the line 4 due to any cause the pressure on the under-side of valve 14 will be relieved. As a result, the unbalanced downward pressure of the head of cooler liquid in the reservoir 10 will be greater than the pressure from the hotter liquid passing through the condenser and will serve to open the valve and permit water from the tank to enter the feed line 4. The backward pressure exerted upon the valve 15 by this inrush of water serves to close it and consequently directs the entire flow from the tank 10 into the condenser 1. Inasmuch as an appreciable head is required to force the cooling fluid up through the tortuous passage formed by the baffle 8, the tank 10 must be positioned at a considerable height above the upper end of the condenser; that is, the available head determined by the difference in weight of the cold water column in tank 10 and line 13 and that of the warm water column in the condenser and in line 11 must be sufficient to maintain a steady circulation of liquid through the condenser.

During its passage through the condenser the cooling water becomes heated and, inasmuch as the column of heated water rising in the pipe 11 is lighter than the column of cold water descending through the line 13, a thermo-siphon action will occur and a continuous circulation be established between the tank and the condenser through their connecting pipes. If the vapor in the condenser 1 accumulates more rapidly than under normal conditions due to the fact that it is not being condensed as perfectly, the temperature in the condenser will rise slightly and will increase the thermo-siphon action of the apparatus, thus supplying cooling water more rapidly. The tank 10 is preferably made large enough so that the vapor supply to the condenser may be condensed for a period of from 2 or 3 minutes to one hour or more, during which time ample precautions may be taken to restore the normal supply of cooling fluid or stop or divert the supply of vapor to the condenser. When the normal supply of cooling fluid is again set in motion the pressure exerted by the pump 5 will cause valve 15 to open and a pressure will again be exerted upwardly on the valve 14 sufficient to close it and to maintain it closed until further interruption of the water supply. A hand operated or thermostatically controlled valve may be provided in line 13 if desired so that the tank 10 may be retained full to capacity even after the supply pump 5 has been shut down.

I have described the application of my improved system to the protection of a condenser of any type, and have referred to that type of condenser disclosed in the Russell C. Jones patent previously mentioned. It is to be understood that my protective system is applicable to condensers or heat exchangers of the general type which preferably comprises a tubular passage for one of the fluids and a space surrounding the tubes for containing the other fluid. The cooling fluid may be passed through the tubes or through the space surrounding the tubes, as desired, the provision of a baffle or other means for directing the flow through the condenser being common.

My invention is further applicable to that type of condenser commonly employed in oil refineries which is known as a "fractional" condenser, inasmuch as only a fraction of the vapors admitted to the apparatus are condensed. The oil vapors issuing from the distilling apparatus commonly comprise a number of distinct components the vaporizing temperatures of which are different. It is possible, therefore, to condense certain of these constituents within the apparatus while those of lower boiling point may pass through uncondensed. The cooling medium in the condenser may conveniently be cold water or, as is often the case in oil refining establishments, cold oil on its way to the distilling apparatus. The heat imparted to the cold oil in its passage through the condenser is utilized in the distilling apparatus in that a lesser amount of heat is necessary to raise the temperature of the incoming oil to the desired degree. It is obvious that this invention may be applied to a system in which oil or other liquid is employed as the cooling medium, as well as in one in which cold water is the circulating fluid of the condenser.

I have illustrated and described my invention as applied to the protection of a single condenser, but the storage tank 10 may be arranged to protect a number of condensers as illustrated in Fig. 2. The battery of condensers 1 may normally be supplied with cooling fluid through a common line 4, and the water after traversing the condensers may be conveyed to the tank 10 through a common line 11. However, if desired, each condenser may be provided with its individual connections and supply pump. Ordinarily a battery of condensers as shown will be associated with a common source of vapor supply or will at least be supplied with vapor of some kind. However, it is possible to operate a battery of condensers in this manner, some of which are, for instance, condensing oil vapors while others are condensing the output from an evaporator plant. I preferably employ a single storage reservoir or elevated tank 10 which may be located at any convenient point above the level of the condensers. If desired, however, a plurality of storage tanks 10 may be provided, the capacity of each tank being determined by the number and size of the condensers which it is to protect.

While I have described and illustrated a preferred embodiment of my invention, it is to be understood that a number of changes may be made in the specific features of the layout without departing from the spirit of the invention as defined in the appended claims.

I claim:

1. Apparatus of the class described, comprising a condenser for receiving the hot vapors, means for normally maintaining a circulation of cooling fluid through said condenser, and means for automatically maintaining said circulation for a substantial length of time upon failure of said first mentioned circulating means.

2. Apparatus of the class described, comprising a condenser for receiving the hot vapors, a principal means for normally supplying cooling fluid to said condenser, and independent means actuated in definite relation to the flow of said cooling medium for automatically maintaining a circulation of the cooling medium through the condenser upon failure of said principal fluid supplying means.

3. Apparatus of the class described, comprising a condenser for receiving the hot vapors, a principal means for normally supplying cooling fluid to said condenser, and independent fluid supplying means comprising a fluid reservoir, connections between the reservoir and said condenser, and a control valve in said connections actuated in definite relation with the flow of the principal fluid supply.

4. Apparatus of the class described, comprising a condenser for receiving the hot vapors, a principal means for normally supplying cooling fluid to said condenser, and independent fluid supply means comprising a fluid reservoir, connections between the reservoir and said condenser, and a control valve in said connections normally maintained closed, said valve being automatically opened upon failure of said principal fluid supplying means for maintaining a circulation through said condenser.

5. Apparatus of the class described, comprising a condenser for receiving the hot vapors, a principal means for normally supplying cooling fluid to said condenser, and independent fluid supplying means comprising a fluid reservoir positioned at a higher level than said condenser, a connection between the fluid reservoir and the condenser, and a valve in said connection normally maintained closed by the pressure of said principal fluid supply, said valve being automatically opened by the pressure of the liquid in said reservoir upon failure of said principal fluid supply.

6. Apparatus of the class described, comprising a condenser for receiving the hot vapors, a principal fluid passage for normally conveying cooling fluid to said condenser, and independent fluid supplying means comprising a fluid reservoir positioned at a higher level than said condenser, a valve in said connections normally maintained closed by the pressure of said principal fluid supply, and a second valve in said principal fluid passage normally maintained open, said first valve being automatically opened and said second valve automatically closed by the pressure of the liquid in said reservoir upon failure of said principal fluid supply.

In testimony whereof I affix my signature.

ARTHUR G. BOGARDUS.